United States Patent [19]

Furuhashi et al.

[11] Patent Number: 4,942,273
[45] Date of Patent: Jul. 17, 1990

[54] MULTIPLE CIRCUIT SWITCH WITH ROCKABLE ACTIVATOR AND LINEARLY MOVABLE CONTACT HOLDER

[75] Inventors: Kenshi Furuhashi; Hiroyasu Ito; Nobuyuki Enari, all of Niwa, Japan

[73] Assignee: Kabushiki Kaisha Tokai-Rika-Denki Seisakusho, Japan

[21] Appl. No.: 337,154

[22] Filed: Apr. 12, 1989

[30] Foreign Application Priority Data

Apr. 14, 1988 [JP] Japan .............................. 63-50293[U]

[51] Int. Cl.⁵ ............................................ H01H 19/00
[52] U.S. Cl. ................................ 200/61.54; 200/17 R; 200/561
[58] Field of Search ................ 200/16 C, 16 D, 61.27, 200/61.3, 61.34, 61.35, 61.54, 330, 560, 561, 339, 16 R, 17 R

[56] References Cited

U.S. PATENT DOCUMENTS

| 3,334,201 | 8/1967 | Mutschler et al. | 200/61.54 |
| 4,149,048 | 4/1979 | Winter et al. | 200/61.54 |
| 4,293,743 | 10/1981 | Iwata et al. | 200/61.54 X |
| 4,300,026 | 11/1981 | Bull | 200/16 C X |
| 4,563,551 | 1/1986 | Black, III et al. | 200/16 C |
| 4,659,880 | 4/1987 | Kondo et al. | 200/16 C X |

Primary Examiner—J. R. Scott
Attorney, Agent, or Firm—Oliff & Berridge

[57] ABSTRACT

A switch apparatus comprises an arm which is rotated by a rotational force added to an operation knob and thus linearly drives a contact holder through an engagement portion so as to change over contacts points. The engagement portion is received in a groove formed in the contact holder and has surfaces which hold the center line in the radial direction of the arm, each surface having a circular arc form with a center substantially in the same place at a position equi-distance on either side of the center line so that the change in movement of the contact holder with the change in rotational angle of the arm is substantially constant.

12 Claims, 4 Drawing Sheets

MULTIPLE CIRCUIT SWITCH WITH ROCKABLE ACTIVATOR AND LINEARLY MOVABLE CONTACT HOLDER

BACKGROUND OF THE INVENTION

1. Field of the Invention

The present invention relates to a knob switch apparatus which causes a contact holder to linearly move by means of an arm using the rotational operation of an operation knob. Description of the Related Art An example of conventional switch apparatuses for wipers in automobiles comprises a spherical pressure portion provided at the end of an arm which is swung by the rotationaloperation of an operational knob provided at the end of a lever, the pressure portion being inserted into a groove of a contact holder. The contact holder is linearly moved by being pressed by the pressure portion of the arm when the operational knob is rotated. The switch is consequently switched corresponding to the movement of the contact holder.

In the above-described conventional arrangement, as shown in FIG. 7, a contact holder is moved along a distance a when an arm 1 is rotated through angle α in the direction shown by the arrow A from the standard state wherein a pressure portion 2 of the arm 1 points in a vertical direction. When the arm 1 is further rotated through angle α in the direction shown by the arrow A, the contact holder is also moved along a distance b. Movement distance b is smaller than movement distance a (b<a). That is, there is a disadvantage in that the distance of movement of the contact holder is reduced as the rotation angle of the arm 1 increases even if the operational angle of the operation knob is constant.

Accordingly, it is an object of the present invention to provide a knob switch apparatus which is capable of preventing the difference in movement of a contact holder from being increased due to the difference in the rotational angle of an arm.

SUMMARY OF THE INVENTION

In a knob switch apparatus of the present invention in which an arm is rotated by the rotational operation of an operation knob, a contact holder is linearly moved by being pressed by a pressure portion provided at the end of the arm with the rotation of the arm so that the state of the switch is changed. It is characterized in that the pressure portion has a surface which comprises two circular arc portions each having a center at a given distance from the center line in the direction of extension of the arm, as well as holding the center line therebetween.

The above-described means causes the distance from the rotational center of the arm to the contact point of the pressure portion which contacts the contact holder to be increased as the rotational angle of the arm increases, as compared with conventional apparatus. The distance in which the contact holder is moved is therefore not significantly decreased as the rotational angle of the arm increases, whereby the distance of movement of the contact holder can be made constant.

BRIEF DESCRIPTION OF THE DRAWINGS

The accompanying drawings from FIG. 1 to FIG. 6 illustrate the preferred embodiment of the present invention.

DETAILED DESCRIPTION OF PREFERRED EMBODIMENT

Figure 2:
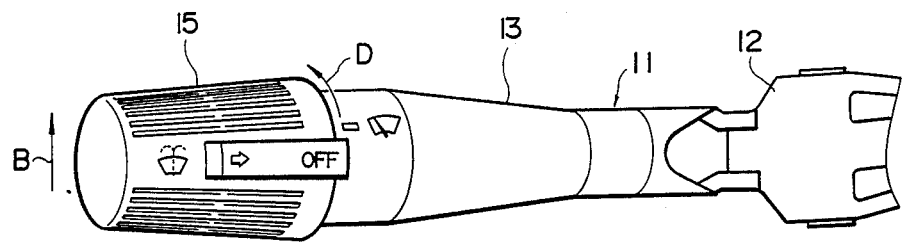
FIG. 2 is a perspective view of a lever.
Figure 3:
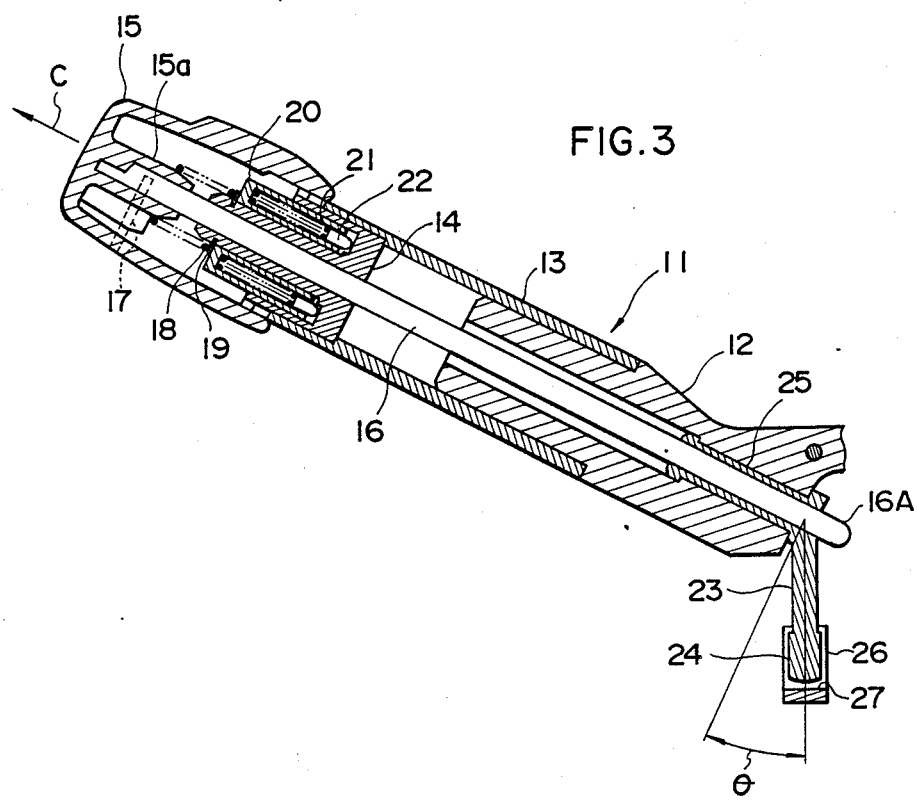
FIG. 3 is a longitudinal sectional view of the lever.

In FIGS. 2 and 3, a lever 11 comprises a cylindrical body 13, which is engaged with the periphery of the end of a support body 12 which is rotatably mounted on the steering column (not shown) of an automobile. When the lever 11 is moved in the direction shown by the arrow B in FIG. 2 or in the reverse direction, a turn signal switch (not shown) provided in the steering column is operated. A receiving body 14 is engaged with the internal periphery of the cylindrical body 13, and an operation knob 15 is provided on the periphery thereof. The operation knob 15 is provided at the end of the cylindrical body 13 so as to be rotatable relative to the lever 11 around the axis thereof and movable relative to the lever 11 in the axial direction thereof. A rod 16 is provided in the lever 11 so as to pass through the receiving body 14 and has an end which is fixedly connected to a cylindrical portion 15a of the operation knob 15 by means of a pin 17 so as to be rotated and axially moved integrally with the operation knob 15.

A return spring 18 comprising a compression coil spring is interposed between the operational knob 15 and a stop ring 19.which is provided in the periphery of the end of the receiving body 14. The operational knob 15 is urged by the force of the spring 18 in the direction (shown by the arrow C in FIG. 3) in which the operation knob 15 is pushed out from the lever 11. In this case, if the operation knob 15 is pushed against the urging force of the return spring 18 in the direction reverse to the direction shown by the arrow C, the rod 16 is moved in the same direction so as to allow an end 16A of the rod 16 which is shown in the lower right portion in FIG. 3 to operate a washer switch (not shown).

A detent case 20 is provided on the periphery of the receiving body 14 in such a manner that it is rotated integrally with the operation knob 15 when the operational knob 15 is rotated, but so that it does not move when the operational knob 15 is moved in the direction shown by the arrow C or in the reverse direction. In the detent case 20, are disposed a detent spring 21 comprising a compression coil spring and a detent piece 22 urged by the detent spring 21. The detent piece 22 is brought into press contact with a groove (not shown) provided in the internal surface of the receiving body 14 to form a detent mechanism which causes the operational knob 15 to be imparted with the detent function when the operational knob 15 is rotated.

On the other hand, a cylindrical portion 25 of an arm 23 is rotatably inserted into the base end of the lever support body 12 so as to support the vicinity of the end 16A of the rod 16. The cylindrical portion 25 is also engaged with a pin (not shown) which is provided in the rod 16 so that, when the operational knob 15 is rotated in the direction shown by the arrow D in FIG. 2 or in the reverse direction, with the rod 16 being rotated in the same direction, the arm 23 is subjected to a rotational force and thus swung in the direction shown by the arrow E in FIG. 1 or in the reverse direction with a center at the rod 16.

The arm 23 projects in the lengthwise direction which deviates from the plane vertical to the axis of the lever 11 and has an end provided with a pressure portion 24 which is inserted into a groove 27 formed in a contact holder 26. When the arm 23 is rotated, the contact holder 26 is pressed by the pressure portion 24 and guided so as to move in the direction shown by the arrow F in FIG. 1 and in the reverse direction. The states of a wiper switch 30 are changed following the movement of the contact holder 26.

The wiper switch 30 can be switched in that a movable contact point 32 which is moved together with the contact holder 26 is connected with, any one of fixed contact points 34A, 34B, 34C and 34D.

Figure 4:
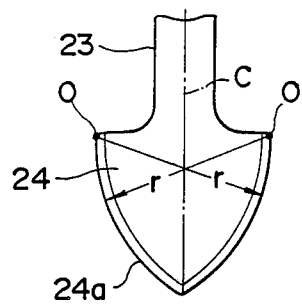
FIG. 4 is an enlarged front elevational view of a pressure portion.
Figure 5:
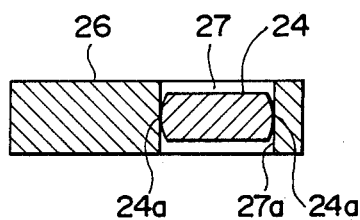
FIG. 5 is a transverse sectional view taken along section line V—V in FIG. 1.

The pressure portion 24 is substantially cordiform, and, particularly, as shown in FIG. 4, has outer surfaces which are symmetric with respect to the center line c in the direction of extension of the arm 23 and which are each formed into a substantially circular arc having a center 0 at a position at a given distance from the center line c which is held therebetween. In this case, the radius r of the circular arc is determined to be the same as the width d of the groove 27 (refer to FIG. 1) in the contact holder 26 so as to be tightly receivable in the groove 27. As shown in FIG. 5, the pressure portion 24 also has outer surfaces each having a circular arc-shaped cross section so that each of the two sides on either side of a widthwise center 24a has a width smaller than that at the center 24a. Both widthwise sides of the pressure portion 24 are therefore apart from the internal sides 27a of the groove 27, as compared with the widthwise center 24a thereof. Thus the periphery of the pressure portion 24 is always brought into contact with the internal sides 27a of the groove 27 even if the lever 11 is rotated in the direction shown by the arrow D or in the reverse direction.

Figure 1:
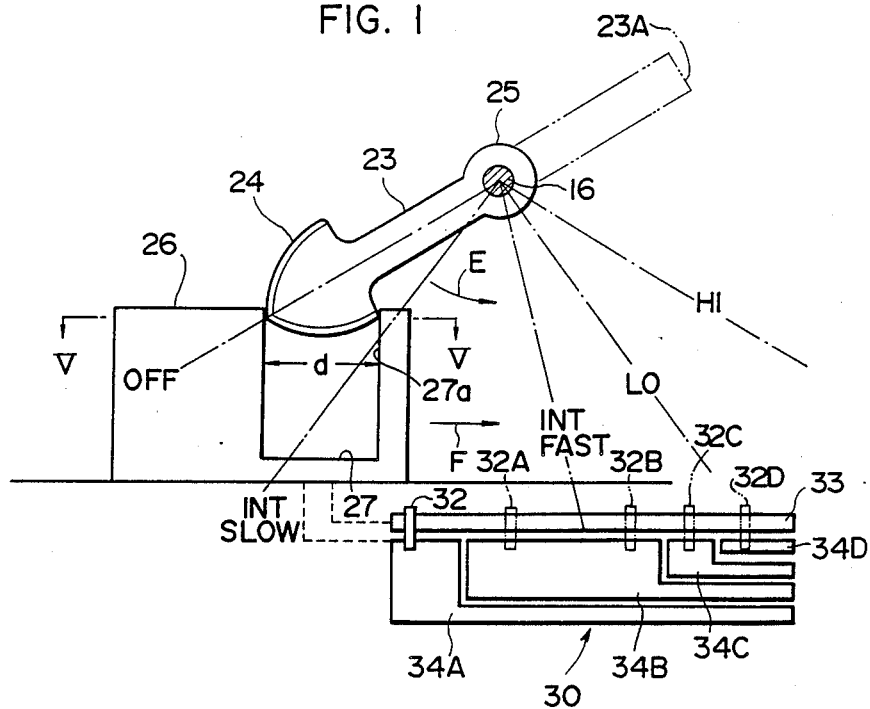
FIG. 1 is a front elevational view of a main portion of an embodiment of the present invention.

The aforementioned configuration therefore causes the arm 23 to be rotated in the direction shown by the arrow E in FIG. 1 with the center at the rod 16, as the rod 16 is rotated integrally with the operation knob 15 in the same direction as that of rotation of the operational knob 15 in the direction shown by the arrow D in FIG. 2. With the rotation of the arm 23, the contact holder 26 is linearly moved in the direction shown by the arrow F in FIG. 1 by being pressed by the pressure portion 24, while the contact point of the pressure portion with the internal sides 27a of the groove 27 in the contact holder 26 is successively changed. The movement of the contact holder 26, causes the states of the wiper switch 30 to be switched from an OFF state produced by the fixed common contact point 33 and the fixed contact point 34A to an ON state produced by the fixed common contact point 33 and the fixed contact point 34B and then to an ON state produced by the fixed common contact point 33 and the fixed contact point 34C, whereby a wiper is operated with the speed increasing in steps. And, with rotation of the arm 23 between the INT SLOW and the INT FAST positions shown in FIG. 1, the condition with the movable contact 32 connecting the fixed common contact point 33 and the fixed contact point 34B does not change. However the rotation of the rod 16 is detected by a detector (not shown) and depending on the angular rotation, the intermittent operation interval of the wiper is changed. In the condition with the fixed common contact point 33 connected to the fixed the contact 34B, 34C or 34D by the movable contact 32, rotation of the operation knob 15 so that the arm 23 returns to the OFF position (FIG. 1), results in the movable contact 32 moving to the position to connect the fixed common contact point 33 and the fixed contact point 34A. In order to return the wiper to its origin position the switch circuit is then changed.

Figure 6:
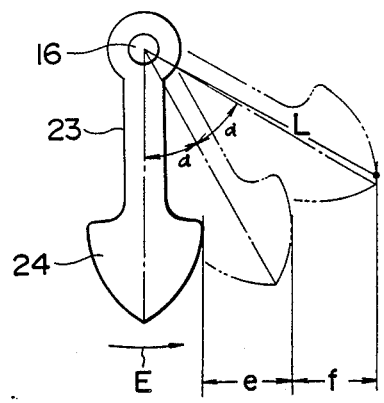
FIG. 6 is an elevational explanatory view of the main portion of the embodiment showing operation thereof.

In the above-described embodiment, as shown in FIG. 6, the distance e in which the contact holder 26 is moved by rotation of the arm 23 through an angle $\alpha$ in the direction shown by the arrow E from a standard state wherein the center line of the pressure portion 24 of the arm 23 points in the vertical direction, is substantially the same distance f in which the contact holder 26 is moved by further rotation of the arm 23 through an angle $\alpha$ in the direction shown by the arrow E.

Figure 7:
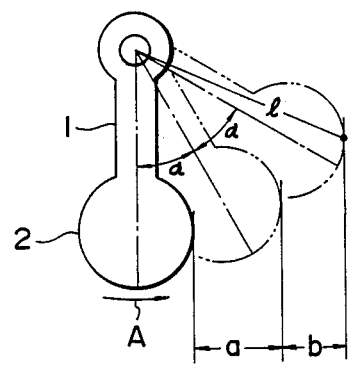
FIG. 7 is an elevational explanatory view of a conventional structure corresponding to the drawings in FIG. 6.

If the embodiment is compared with the conventional apparatus shown in FIG. 7, the distance L between the center of rotation (the rod 16) of the arm 23 and the pressure point of the pressure portion 24 serving to press the contact holder 26 is increased to a value greater than the distance 1 in the conventional arm (L>1) as the rotational angle of the arm 23 increases. Unlike the conventional configuration in which the distance of movement of the contact holder is decreased as the rotational angle of the arm increases, this embodiment enables the distance of movement of the contact holder 26 to be made substantially constant even if the rotational angle of the arm 23 increases. It also enables the effective operational angle of the operation knob 15 to be set at a large value.

The embodiment of the present invention concerns a form in which the arm 23 projects toward the rod 16 in a cantilever manner. But an arm 23A may be projected from the rod 16 on the extension of the arm 23, as shown by the phantom lines in FIG. 1, so that the arm 23A is imparted with a rotational force.

What is claimed is:

1. A switch apparatus which is switched by rotation of an operation knob, comprising:
   an arm having two ends which is supported at one end thereof and which is rotated about said one end by said operation knob;
   (b) a contact holder having a groove and movable electrical contact point and which is supported so as to be linearly moved by being subjected to a force produced by the rotation of said arm;
   (c) a plurality of fixed electrical contact points which are connected to and disconnected from said movable electrical contact point by the linear movement of said contact holder; and
   (d) an engagement portion provided at a contact portion of said arm and said contact holder and which has an outer shape which allows a position of said contact portion to be gradually changed by said rotation of said arm, whereby said contact holder can be uniformly moved in a linear direction by said rotational force substantially in proportion to the angle of rotation of said arm.

2. A switch apparatus according to claim 1, wherein said engagement portion comprises surfaces each having a substantially circular arc form with centers substantially in a same plane at predetermined distances on opposite sides of a line drawn in a radial direction of said arm from the center of rotation of said arm and included in said same plane.

3. A switch apparatus according to claim 1, wherein said engagement portion is inserted into a groove formed in said contact holder such that a portion of said engagement portion is maintained in close engagement with said contact holder.

4. A switch apparatus according to claim 3, wherein a width of said groove is substantially constant from a bottom thereof to an entrance thereof, and said engagement portion has a symmetrical form with respect to a line in the radial direction of said arm from the center of rotation of said arm, as well as having a width gradually decreased toward a radially outer end.

5. A switch apparatus according to claim 4, wherein said engagement portion comprises two surfaces each having a substantially circular arc form with a center at a given distance from said line in the radial direction of said arm on opposite sides of said line and substantially in a plane including said line.

6. A switch apparatus according to claim 1, wherein an end of said arm is mounted on said operation knob in such a manner that a radial direction of said arm deviates from a plane perpendicular to the axis of said operation knob, and the shape of surfaces of said arm adjacent to said engagement portion is such that said surfaces do not contact the internal periphery of said engagement groove of said contact holder during said rotation by said rotational operation.

7. A knob switch apparatus which is operated by a rotational operation of an operation knob, comprising:
   (a) an arm with one end connected to said operation knob and projecting in a direction deviating from a plane perpendicular to a rotational axis of said operation knob, and which is rotated together with said operation knob about said rotational axis;
   (b) a contact holder having a movable electrical contact point and which is linearly moved by being subjected a force produced by the rotation of said arm;
   (c) fixed electrical contact points which are connected to and disconnected from said movable electrical contact point in correspondence with a linear movement of said contact holder; and
   (d) an engagement portion which is provided at a portion of another end of said arm, functioning to transmit said force produced by rotation of said arm to said contact holder when said arm is inserted into a groove in said contact holder and which has opposite surfaces each having a circular arc form, and a width between said opposite surfaces which decreases uniformly with distance from said rotational axis to an end tip in a relation such that said linear movement is substantially proportional to a rotation of said arm for an contact position of said engagement portion.

8. A switch apparatus according to claim 7, wherein said engagement portion comprises surfaces each having a circular arc form with a center substantially in a same plane at predetermined distance on opposite sides of a line drawn in the radial direction of said arm from said rotational center of said arm and included in said same plane.

9. A switch apparatus according to claim 7, wherein said engagement portion is inserted into said groove formed in said contact holder in close engagement with said contact holder.

10. A switch apparatus comprising an operation knob rotatably supported about a longitudinal axis, an arm having a pressure portion at one end and another end fixed to said operation knob so that said arm is swung about said axis by a rotational operation of said operation knob, an electrical contact holder which is linearly moved by being pressed by said pressure portion and which has mounted thereon a first electrical contact point, and fixed electrical contact points whose states of connection with said first electrical contact point are changed corresponding to the movement of said contact holder, said engaging portion having an outer shape comprising two opposing portions on either side of a longitudinal center line of said arm through said axis and which eac has a substantially circular arc form with a center at a position at a given distance from said center line and substantially in a same plane including said center line said circular arc forms meeting at a tip portion.

11. A switch apparatus according to claim 10, wherein said pressure portion is inserted into a groove formed in said contact holder and said two opposing portions are in close engagement with walls of said groove.

12. A switch apparatus according to claim 7, wherein said arm is mounted on said operation knob in such a manner that an other end of said arm is movable in an axial direction of said operation knob, and said arm is so disposed that a radial direction thereof deviates from a plane perpendicular to the axis of said operational knob, and is formed such that both opposite sides thereof adjacent to said opposite surfaces of said engagement portion are separated further from the internal periphery of said groove of said contact holder than portions of said engagement portion disposed on a plane centered between said both opposite sides.

* * * * *